May 26, 1931.  C. H. QUACKENBUSH  1,807,252

ARMATURE WINDING

Filed Dec. 28, 1926  3 Sheets-Sheet 1

INVENTOR
Cleveland H. Quackenbush
BY
ATTORNEY

May 26, 1931. C. H. QUACKENBUSH 1,807,252
ARMATURE WINDING
Filed Dec. 28, 1926 3 Sheets-Sheet 2

INVENTOR
Cleveland H. Quackenbush
BY
John R. Milburn
ATTORNEY

INVENTOR
Cleveland H. Quackenbush
BY
ATTORNEY

Patented May 26, 1931

1,807,252

UNITED STATES PATENT OFFICE

CLEVELAND H. QUACKENBUSH, OF SOUTH EUCLID, OHIO

ARMATURE WINDING

Application filed December 28, 1926. Serial No. 157,569.

This invention relates to improvements in armature windings and the method of forming the same.

The objects of the present invention are to provide an armature winding in which the wires of the coils are so interwoven as to maintain each other against accidental displacement and at the same time produce a true balance both mechanically and electrically.

A further object is to devise a method of winding an armature whereby it is possible to form all of the coils simultaneously and initially or directly upon the frame of the armature, instead of first forming the coils of wire and then placing the same upon the armature frame, or instead of forming the loops one at a time upon the armature frame.

Other objects will be suggested by the following description and claims when considered together with the accompanying drawings.

Figure 1:
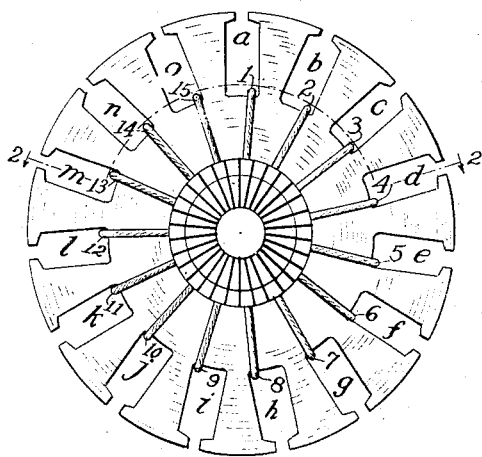
Figure 2:
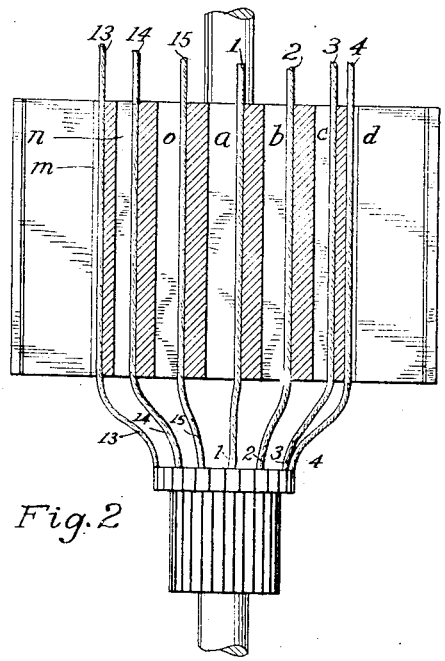
Figure 3:
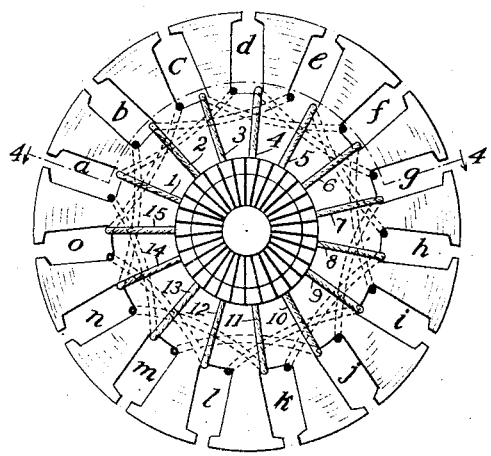
Figure 4:
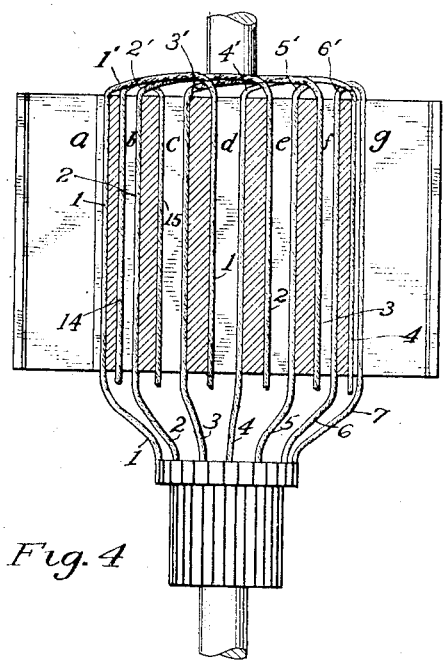
Figure 5:
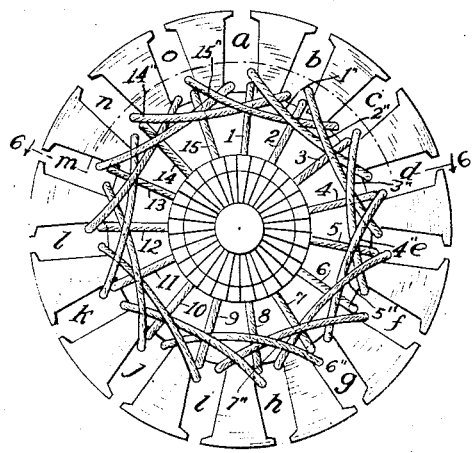
Figure 6:
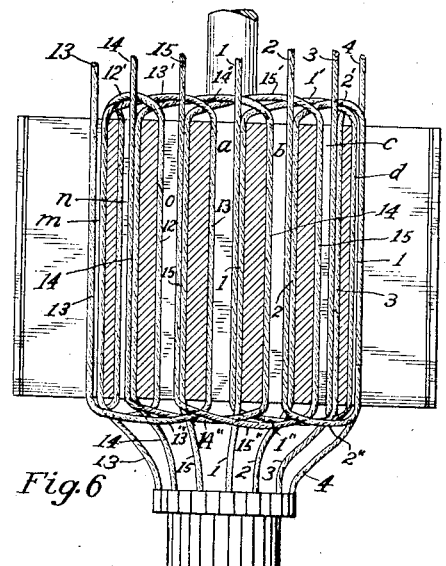
Figure 7:
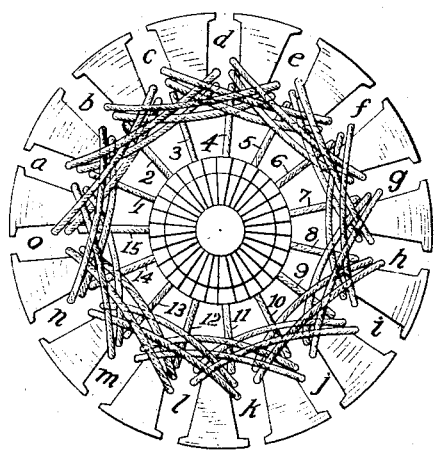
Figure 8:
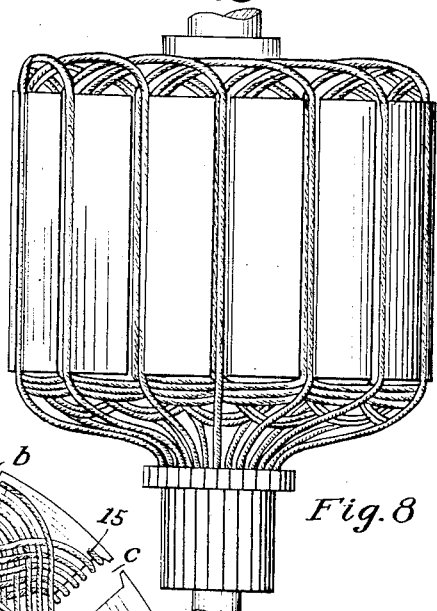
Figure 9:
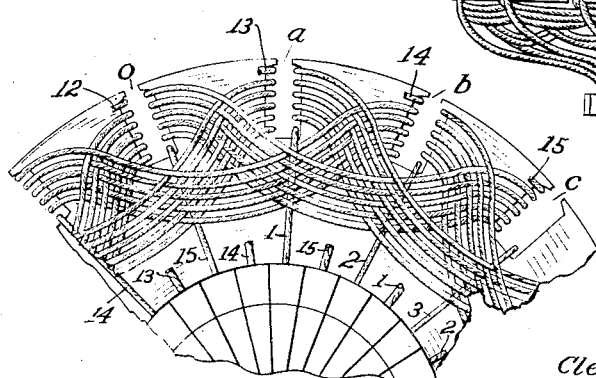
Figure 10:
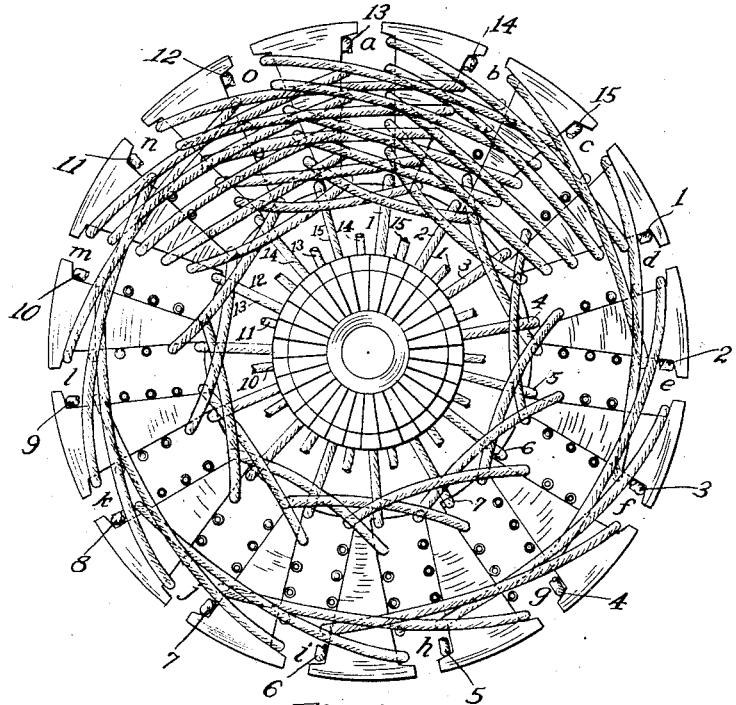
Figure 11:
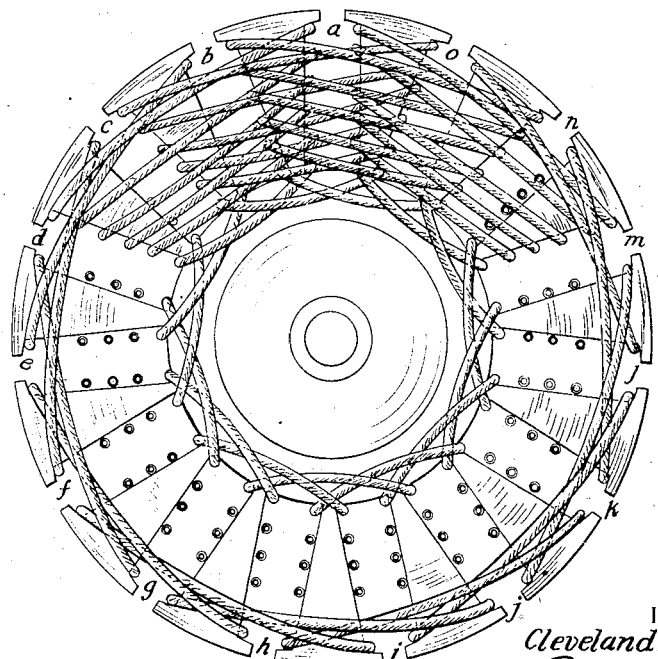

Fig. 1 is an end view illustrating the first step in forming the coils according to my improved method; Fig. 2 is a view taken on line 2—2 of Fig. 1; Fig. 3 is an end view illustrating the second step; Fig. 4 is a view taken on line 4—4 of Fig. 3; Fig. 5 is an end view illustrating the third step; Fig. 6 is a view taken on line 6—6 of Fig. 5; Fig. 7 is an end view illustrating the fourth step; Fig. 8 is a side elevation of the completely wound armature; Fig. 9 is a partial diagrammatic bottom plan view showing the arrangement of the wires, the terminal portions of the wires being broken away for the sake of clearness; Fig. 10 is a bottom plan view of the completely wound armature, with the terminal portions of the wires broken away; and Fig. 11 is a top plan view of the completely wound armature, only a part of the windings being illustrated.

The armature core, as here illustrated, has fifteen grooves and there are therefore provided, according to my invention, the same number of wires or strands of wires. As a matter of convenience in illustration, I have here shown single wires, and the grooves are here shown as extending parallel with the longitudinal axis of the core, and are also shown relatively large for the sake of clearness. A wire, as here illustrated, is thus provided for each groove, and for the sake of convenience and clearness in referring to the same, I have given the wires numbers from 1 to 15 and have indicated the corresponding grooves, in which the respective wires are wound, by means of the letters *a* to *o*, inclusive.

According to my method, wire 1 is first placed in the bottom of groove *a*, wire 2 is placed in groove *b*, wire 3 in groove *c*, etc., (Figs. 1 and 2). The initial ends of the wires are all anchored in any suitable manner so as to permit the wires to be drawn taut as they are wound through the grooves, the wires being wound from spools. Then, having laid all the wires simultaneously in their respective grooves, there is caused relative movement between the core and the wires or spools of wires as a unit. This may be accomplished by either rotating the frame while maintaining the wires and their spools stationary, or by moving the wires about the axis of the frame while maintaining the frame stationary. Such relative movement may be to the extent of any number of spaces between the grooves, according to the number of poles it is desired to produce in the finished armature. In the present armature, I have shown a relative movement of three spaces, so that wire 1 will then be opposite groove *d*, wire 2 will be opposite the groove *e*, wire 3 opposite groove *f*, etc. Such relative movement has now caused the wires to extend across the end of the frame, as for instance between grooves *a* and *d*, as indicated by reference numerals 1', 2', etc. The wires are then all simultaneously drawn back through their respective grooves which are now located opposite the same. (See Figs. 3 and 4.) There is then caused a reverse relative movement between the frame and all the wires considered as a unit, this movement being of the same extent as the first relative movement, so that wire 1 is now brought opposite groove *a*, wire 2 opposite groove *b*, etc. This second relative movement likewise causes the wires to extend across the other end of the frame, that is between the grooves $d$ and $a$, etc., as indicated by reference numerals 1'', 2'', etc., (Figs. 5 and 6). Each wire has now been formed into a single loop and all of these loops have been formed simultaneously and have at the same time and by the same operation been applied directly and at once to their proper position upon the frame. These loops overlap each other in a uniform and progressive manner about the entire core and together constitute a perfect balance, both mechanically and electrically, as will hereinafter appear.

The same operation, as above outlined, is now repeated. That is, wire 1 is wound through groove $a$, wire 2 through groove $b$, etc.,—all simultaneously,—and the relative movements are produced in the same manner so as to permit the wires to be wound in the manner as above outlined. (See Fig. 7.) This operation is kept up until the grooves are filled, or until there are produced the desired number of layers of windings for each coil. Fig. 9 shows, on a somewhat larger scale, how the wires cross and re-cross each other at the one end in a progressive manner as they are wound back and forth in forming the loops. The remaining free ends of the several individual wires as well as the initial ends are then connected to their individual commutator segments in the same manner as is already well known in the art, and the slots or grooves are closed by the well-known strips of fibre or the like. These strips are omitted from the present illustration. Electrically, the general operation of my improved armature is the same as in the prior art, although my particular form of winding possesses certain advantages which are to be now briefly referred to.

With my method of winding, there is eliminated the necessity of subsequently balancing the armature, as a whole, after the loops and accessories are completely built up. My particular form of winding reduces to a minimum the danger of the breaking down of the insulation which is often caused by sparking between the turns of the wire. This is true since, in my form of winding, the end portions of each coil lie in different grooves and are hence separated from each other. Likewise the initial end of one coil and the terminal end of another coil are spaced from each other, the one lying in the bottom of the groove while the other extends on the outside of all the layers of wires in that particular groove, as will be seen from the drawings. Hence, there is no danger of these particular portions of wires contacting with each other in my form of winding; and the familiar danger of sparking, due to potential difference, is absent in the present case.

From the above it will be seen that I have produced an armature winding that is perfectly balanced both mechanically and electrically, which means smoother and quieter running of the same, as well as less wear upon the bearings and less danger of breaking down of the insulation, and hence longer life. Also, because of the interwoven or interlocking form of winding, the snug and compact arrangement of the end portions of the completed coils are prevented from accidental displacement which would otherwise be caused by the high speed of rotation except for the bands which are commonly used at this point. In other words, I have precluded the necessity of such bands. Moreover, these end portions extend only a minimum distance longitudinally of the armature frame, with the result that there is only a minimum surface to be covered with dirt-resisting material. Also, the open spaces between the wires facilitate the application of an insulating liquid so as to reach the individual wires. Notably among the several advantages is that which resides in the facility and speed with which armatures can be wound with my improved method. This means a decided saving in the cost of production.

It is to be understood that my invention may be applied to either rotor or stator, the showing in the present drawings, being only for purposes of illustration, and that the following claims are intended to cover any suitable means that may be devised for performing the method here outlined.

What I claim as new is:

1. The method of winding a drum armature which includes winding the wire initially and directly upon the armature frame in the form of a plurality of simultaneously formed loops and at the same time effecting and maintaining mechanical balance at all times and entirely about the axis thereof during the winding operation.

2. The method of winding a drum armature which includes simultaneously winding a plurality of separate wires initially and directly upon the armature frame in the form of a plurality of simultaneously formed loops and at the same time effecting and maintaining mechanical balance at all times and entirely about the axis thereof during the winding operation.

3. The method of winding a drum armature which includes winding the wire initially and directly upon the armature frame in the form of a plurality of simultaneously formed loops and at the same time effecting and maintaining mechanical and electrical balance entirely about the axis thereof and at all times during the winding operation.

4. The method of winding a drum armature which includes simultaneously winding a plurality of separate wires initially and directly in all the grooves of an armature frame and causing relative back and forth movement between the armature frame and the wires in a direction about the axis of the frame during the winding operation so that the wires will be wound in loop form.

5. The method of winding a drum armature which includes simultaneously laying a plurality of separate wires initially and directly each in a different groove about the entire armature frame, then simultaneously carrying forward said wires to other grooves, then laying each respective wire in the opposite direction along one of said other grooves, and then laying each respective wire in the original direction along its original groove, and so on, so as to form the wires in loops.

6. The method of winding a drum armature which includes simultaneously laying a plurality of separate wires initially and directly in all the grooves and each in a different groove about the entire armature frame, causing relative movement between the armature frame and the wires in a direction about the axis of the frame and simultaneously carrying forward said wires to other grooves, then laying each respective wire in the opposite direction along one of said other grooves so as to form loops.

7. The method of winding a drum armature which includes simultaneously laying a plurality of separate wires initially and directly in all the grooves and each in a different groove about the entire armature frame, causing relative movement between the armature frame and the wires in a direction about the axis of the frame and simultaneously carrying forward said wires to other grooves, then laying each respective wire in the opposite direction along one of said other grooves, causing reverse relative movement between the frame and wires, then laying each respective wire in the original direction and in its original groove, and so on, so as to form loops.

8. An armature comprising a frame having a plurality of equi-spaced grooves thereabout, a plurality of coils arranged in said grooves, each coil consisting of a plurality of individual loops, and the corresponding loops of the several coils partially overlapping each other in balanced interlocking arrangement throughout all loops of the entire winding.

9. An armature comprising a frame having a plurality of grooves equi-spaced thereabout, a plurality of coils arranged in said grooves, each coil consisting of a plurality of overlying individual loops, and the loops of each coil overlapping and alternating with the loops of adjacent coils throughout the entire winding and forming a balanced interlocking arrangement.

10. An armature comprising a frame having a plurality of equi-spaced grooves, a plurality of coils of wires or strands of wires arranged in said grooves, each coil consisting of a plurality of overlying loops, the loops of each coil overlapping and alternating with the loops of adjacent coils throughout the entire winding and forming an interlocking arrangement whereby there is obtained a mechanical balance about the axis of the winding throughout all individual layers, and the final terminal portions of the loops of all coils extending in the same relative arrangement over the outside of said interlocking coils and serving to further maintain the same against accidental displacement.

11. An armature winding comprising a plurality of layers of loops successively arranged radially outwardly, each layer comprising a plurality of loops and the loops of each layer being interwoven with certain of the loops of other layers, whereby there is obtained a mechanical and electrical balance about the axis of the winding.

12. An armature winding comprising a plurality of layers of loops successively arranged radially outwardly, each layer being complete within itself about the axis of the winding and comprising a plurality of loops, and the loops of each layer being interwoven with certain of the loops of other layers whereby there is obtained a mechanical and electrical balance about the axis of the winding.

13. An armature winding comprising a plurality of overlying layers of loops successively arranged radially outwardly, each layer being complete within itself and comprising a plurality of loops, and the loops of each layer being interwoven with certain of the loops of other layers, whereby there is obtained a mechanical and electrical balance about the axis of the winding.

14. An armature winding comprising a plurality of loops successively arranged radially outwardly, each layer being complete within itself and comprising a plurality of loops, and the loops of each layer being interwoven with certain of the loops of other layers, whereby the entire winding is in mechanical and electrical balance about the axis of the winding.

15. An armature winding comprising a plurality of layers of loops successively arranged radially outwardly, each layer comprising a plurality of loops, and the loops of each layer being sufficient to extend about the entire circumference of the winding, whereby the loops of each layer are in mechanical and electrical balance about the axis of the winding.

16. An armature comprising a frame having a plurality of equi-spaced grooves thereabout, and a plurality of separate wire coils comprising loops arranged in distinct compilations throughout the entire winding, the loops of adjacent coils being interlaced with each other, and said coils being so formed and arranged that all the grooves contain the same number of wires in all corresponding compilations throughout the entire winding.

17. An armature comprising a frame having a plurality of equi-spaced grooves thereabout, and a plurality of interwoven, separate wire coils, comprising loops arranged in distinct compilations throughout the entire winding, the loops of said coils being so formed and arranged that all the grooves contain the same number of wires in all corresponding compilations throughout the entire winding.

18. An armature comprising a frame having a plurality of equispaced grooves, a plurality of wires or strands of wires corresponding in number to the number of grooves, said wires or strands of wires compiled in the form of loops arranged in distinct compilations and extending in each case through two grooves, all of said loops being arranged alternately throughout the entire winding, and the end portions of the loops being formed as an interweave in mechanically balanced relation with respect to the longitudinal axis of the frame and throughout all corresponding compilations thereof.

19. An armature comprising a frame having a plurality of equispaced grooves, a plurality of wires or strands of wires corresponding in number to the number of grooves, said wires or strands of wires compiled in the form of loops arranged in distinct compilations and extending in each case in multiple number through two grooves, all of said loops being arranged alternately throughout the entire winding, and the end portions of the individual loops overlapping each other progressively about the entire winding in interlocking arrangement and throughout all compilations thereof.

In testimony whereof I affix my signature.

CLEVELAND H. QUACKENBUSH.